United States Patent
Ghani

(10) Patent No.: US 12,507,701 B2
(45) Date of Patent: Dec. 30, 2025

(54) KNEADING MACHINE FOR DOUGHS HAVING A SCRAPER RING

(71) Applicant: DIOSNA Dierks & Söhne GmbH, Osnabrück (DE)

(72) Inventor: Hashem Ghani, Osnabrück (DE)

(73) Assignee: DIOSNA DIERKS & SÖHNE GMBH, Osnabrück (DE)

( * ) Notice: Subject to any disclaimer, the term of this patent is extended or adjusted under 35 U.S.C. 154(b) by 841 days.

(21) Appl. No.: 17/685,648

(22) Filed: Mar. 3, 2022

(65) Prior Publication Data
US 2022/0256865 A1 Aug. 18, 2022

Related U.S. Application Data

(63) Continuation of application No. PCT/EP2020/074440, filed on Sep. 2, 2020.

(30) Foreign Application Priority Data

Sep. 3, 2019 (EP) ..................................... 19195112

(51) Int. Cl.
*A21C 1/14* (2006.01)

(52) U.S. Cl.
CPC .............. *A21C 1/144* (2013.01); *A21C 1/149* (2013.01)

(58) Field of Classification Search
CPC .......... A21C 1/02; A21C 1/144; A21C 1/1485
See application file for complete search history.

(56) References Cited

U.S. PATENT DOCUMENTS

| | | | | |
|---|---|---|---|---|
| 1,663,830 | A | * 3/1928 | Eirich ................. | B01F 35/4531 366/193 |
| 3,434,697 | A | 3/1969 | Carlson et al. | |
| 4,588,301 | A | * 5/1986 | Bolz ..................... | B01F 27/953 366/314 |

(Continued)

FOREIGN PATENT DOCUMENTS

| | | |
|---|---|---|
| DE | 486947 C | 12/1929 |
| DE | 37 07 404 A1 | 10/1987 |

(Continued)

OTHER PUBLICATIONS

English translation of DE 3707404A1, Uhlich et al., Oct. 1, 1987, obtained Feb. 27, 2025 from <https://worldwide.espacenet.com/> (Year: 2025).*

(Continued)

*Primary Examiner* — Claire X Wang
*Assistant Examiner* — Patrick M Mccarty
(74) *Attorney, Agent, or Firm* — Keating & Bennett, LLP

(57) ABSTRACT

A kneading machine for food dough includes a rotatable kneading bowl, which includes in a bottom a central opening to discharge the food dough, and a closure at or in a vicinity of the opening in an operating position by a movable closure body, and to release the opening to discharge the food dough in a discharge position. The opening is at least partially surrounded by a scraper ring fastened to the kneading bowl and operable to cause an underside thereof to contact with the upper side of the closure body to wipe off a food dough located on the closure body when the closure body is moved from the operating position into the discharge position.

7 Claims, 4 Drawing Sheets

(56) References Cited

U.S. PATENT DOCUMENTS

| | | | | |
|---|---|---|---|---|
| 4,854,715 | A * | 8/1989 | Eirich | B01F 29/83 366/94 |
| 6,652,133 | B2 * | 11/2003 | Ghanizadeh Khoub | A21C 1/02 366/188 |
| 2006/0062078 | A1 * | 3/2006 | Jejcic | B01F 27/091 366/310 |
| 2014/0226433 | A1 | 8/2014 | Ternes et al. | |
| 2016/0327159 | A1 * | 11/2016 | Miller | F16J 15/008 |
| 2017/0143184 | A1 * | 5/2017 | Wegener | D06F 39/026 |
| 2018/0255788 | A1 * | 9/2018 | Kesig | A21C 1/06 |

FOREIGN PATENT DOCUMENTS

| | | | |
|---|---|---|---|
| DE | 202015003751 U1 * | 10/2016 | |
| EP | 2 845 483 A1 | 3/2015 | |

OTHER PUBLICATIONS

Official Communication issued in International Patent Application No. PCT/EP2020/074440, mailed on Dec. 4, 2020.

Official Communication issued in International Patent Application No. PCT/EP2020/074440, issued on Mar. 8, 2022.

English translation of Official Communication issued in International Patent Application No. PCT/EP2020/074440, mailed on Dec. 4, 2020.

* cited by examiner

KNEADING MACHINE FOR DOUGHS HAVING A SCRAPER RING

CROSS REFERENCE TO RELATED APPLICATIONS

This application claims the benefit of priority to European Patent Application No. 19195112.8, filed on Sep. 3, 2019, and is a Continuation Application of PCT Application No. PCT/EP2020/074440, filed on Sep. 2, 2020. The entire contents of each application are hereby incorporated herein by reference.

BACKGROUND OF THE INVENTION

1. Field of the Invention

The present invention relates to a kneading machine for doughs, as well as to a method of stripping a closure body of a closure device of a kneading bowl open at a bottom of a kneading machine for food doughs.

2. Description of the Related Art

Kneading machines for doughs, in particular baking doughs, have a kneading bowl of various sizes for dough masses of 100 to 1000 kg, into each of which a motor-driven kneading tool can be inserted to carry out the kneading process. Kneading machines with a discharge device in the bottom of the kneading bowl are known. Once the kneading process is complete, the dough is discharged downwards from the opened kneading bowl by this discharge device and can be passed on to a line portioner, for example, with the aid of a transport system.

The discharge device conventionally includes a closure body that closes a bottom opening of the kneading bowl in a closed position and releases this opening for discharging the kneading dough in a discharge position. To ensure that no dough adheres to the closure body on the side facing the interior of the kneading bowl, a linear scraper is provided on which any dough on the closure body is wiped off during opening. The linear scraper is arranged outside the bowl opening and above the plate-like closure body in the travel path of the closure body. The arrangement is such that stripped dough also falls into a transport means arranged below the kneading bowl.

SUMMARY OF THE INVENTION

Example embodiments of the present invention improve a scraper of a closure body of a kneading bowl of a kneading machine.

An example embodiment of a kneading machine for food dough according to the present invention includes a rotatable kneading bowl including in a bottom a central opening to discharge the food dough, and a closure structured to close the opening in an operating position by a movable closure body and to release the opening in a discharge position. The opening is at least partially surrounded by a scraper ring, which is fastened to the kneading bowl and operable to cause an underside thereof to contact with an upper side of the closure body to wipe off a portion of the food dough located on the closure body when the closure body is moved from the operating position into the discharge position.

By connecting the scraper ring to the kneading bowl, the dough can be wiped off in a targeted manner, for example, into a container located under the kneading bowl or onto a conveyor belt. Contamination of the closure device can thus be effectively prevented. The kneading bowl is preferably structured to receive dough masses in a range between 100 kg and 1000 kg, for example. The food doughs are preferably doughs for baked goods, in particular biscuit, bread, bread roll or pizza doughs. However, bar doughs can also be processed.

Compared to conventional linear scrapers, a scraper ring according to a preferred embodiment of the present invention has a larger surface area that may become soiled over a longer period of time until it requires cleaning. When the food dough is discharged from the kneading bowl, the scraper ring automatically rotates with the kneading bowl. Dough adhering to the scraper ring may, for example, fall into a container located below the kneading bowl or onto a conveyor belt as a result of the rotation. In addition, it is possible that dough adhering to the scraper ring will collide with the closure body in the discharge position during rotation and thus also fall off.

The scraper ring can be quite generally a closed, 360° ring or open over a certain sector of the circle. Preferably, it is a closed ring that fully surrounds the opening.

The closed scraper ring has the advantage that it is always available to wipe, regardless of the rotational position of the kneading bowl. The rotary position of the kneading bowl does not have to be checked. During each stripping process, another area of the stripper ring available according to the rotary position of the kneading bowl can take over the stripping function. The scraper ring is thus gradually soiled over the entire surface by repeated scraping, so that it retains its function until the next cleaning significantly longer than is the case with conventional linear scrapers.

Preferably, the kneading bowl is seated on a platform, such that a rolling bearing surrounding the opening is provided between the rotatable kneading bowl and the stationary platform to support the kneading bowl relative to the platform, and wherein the scraper ring covers the rolling bearing at least partially on the underside to protect against contamination.

Preferably, the scraper ring is attached to a bowl disk by a fastener, with the kneading bowl being seated on the bowl disk and the bowl disk can be driven in rotation and includes an opening that matches the opening in the bottom of the kneading bowl.

In a preferred embodiment, the rolling bearing includes an inner ring attached to the underside of the bowl disc and an outer ring attached to the platform, with the scraper ring covering the inner ring on the underside thus protecting the bearing from contamination.

It is advantageous if the scraper ring is rotationally symmetrical and includes a circular-cylindrical base body with an opening that is preferably adapted to the opening in the bowl disk and to the bottom of the bowl, to which a conically widening sealing lip adjoins in the radial direction outward.

Preferably, the scraper ring at the free outer end of the sealing lip includes a first annular nose on the upper side close to the bowl disc, which defines a receptacle of an edge region of the platform at an opening of the platform matching the bottom opening. The space in which the rolling bearing is located can thus be tightly sealed.

Preferably, the scraper ring includes a second annular nose on the underside remote from the bowl disc at the free outer end of the sealing lip, which performs the scraper function.

The scraper ring is preferably made of a wear-resistant, food-grade plastic, particularly polyethylene or metal-detectable ultra-high molecular weight polyethylene.

An example embodiment of the present invention provides a method of stripping a closure body of a closure device of a kneading bowl of a kneading machine for food dough open at the bottom, the kneading bowl including a central opening in a bottom to discharge the food dough, and the opening is fully surrounded by a stripping ring fixed to the kneading bowl, and the method includes moving the closure body from an operating position, in which the closure body closes the opening, to a discharge position, in which the opening is uncovered to discharge the food dough. The scraper ring wipes an upper side of the closure body during the process.

The kneading machine and its components, in particular the scraper ring, are preferably structured as described above.

It is preferred that the bowl rotates after the kneading process only after the closure body has released the opening. To discharge the dough, preferably both the bowl and the at least one kneading tool rotate. Dough mass located on the co-rotating scraper ring can fall off due to the rotation. The scraper ring can thus be cleaned by the rotation. Preferably, in the discharge position, the outer edge of the closure body is in the immediate vicinity of the outer edge of the scraper ring, in particular the second annular nose, so that larger dough masses located on the scraper ring can strike the closure body during the rotation of the kneading bowl during discharge and fall off the scraper ring.

The above and other elements, features, steps, characteristics and advantages of the present invention will become more apparent from the following detailed description of the preferred embodiments with reference to the attached drawings.

BRIEF DESCRIPTION OF THE DRAWINGS

Preferred embodiments of the present invention are explained in more detail below with reference to the drawings. Similar or similarly acting components are designated in the drawing figures with the same reference signs.

DETAILED DESCRIPTION

Figure 1:
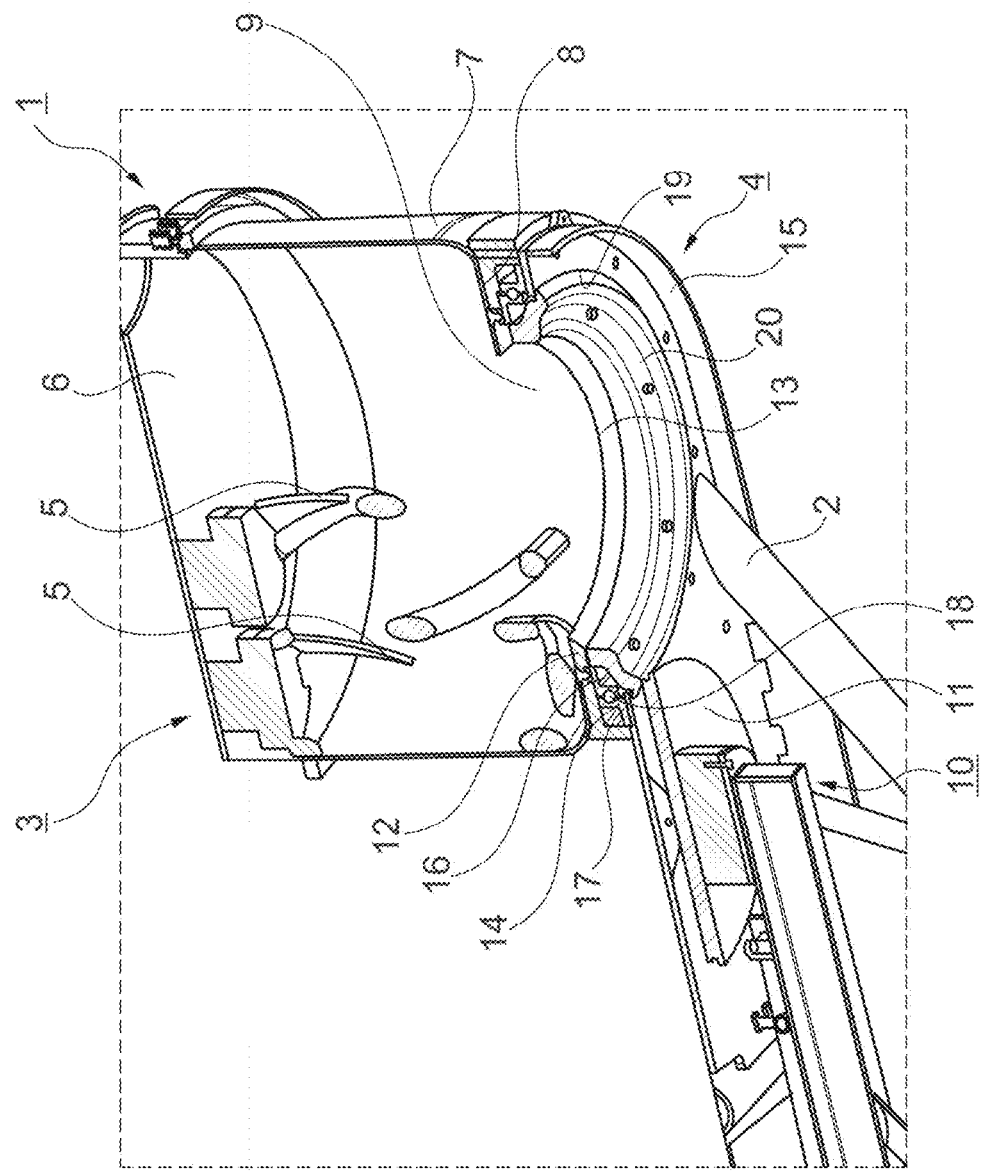
FIG. 1 shows a spatial partial view of a kneading machine with kneading bowl and closure device according to an example embodiment of the present invention.

FIG. 1 shows a section of a kneading machine 1 for processing a food dough, in particular a baking dough. The kneading machine 1 includes a kneading machine frame 2, the head portion 3 of which can be pivoted about a pivot axis, not shown, between a lower operating position and an upper cleaning position relative to a lower portion 4. The head portion 3 carries the kneading tool 5, shown here are two oppositely rotating spiral kneaders, and the drive, not shown, required for a rotation of the kneading tool 5, as well as a cover 6, which is provided for covering the kneading bowl 7, which is open towards the top. In the lower portion 4 of the kneading machine 1, the kneading bowl 7 and an electric motor not shown are arranged. The electric motor rotates the kneading bowl 7 about an axis of rotation relative to the kneading machine frame 2. An opening 9 is provided in the bottom 8 of the kneading bowl 7, which opening can be closed by a closure mechanism of a closure device 10. The closure device 10 includes a movable closure body 11, which is adapted to the opening 9 in the kneading bowl 7 and is substantially plate-shaped. The opening 9 of the kneading bowl 7 is tightly closed by the closure body 11 in a closure position, so that no dough can escape from the bottom opening 9. The closure device 10 further includes an electric motor, not shown, which moves the closure body 11 from the closure position to a discharge position and vice versa. In the discharge position shown in FIG. 1, the opening 9 in the bottom 8 of the kneading bowl 7 is completely uncovered.

The kneading bowl 7 sits firmly on a bowl disk 12, which has an opening 13 corresponding to the bottom opening 9. The bowl disk 12 is preferably made of stainless steel. It is rotationally driven by an electric motor not shown. A roller bearing 14 rotatably supports the bowl disk 12 relative to a platform 15 held spatially fixed on the kneading machine frame 2. The roller bearing 14 includes an inner ring 16, an outer ring 17 and rolling elements 18 arranged therebetween. The inner ring 16 is attached to the underside of the bowl disk 12 and the outer ring 17 is attached to the upper side of the platform 15. The platform 15 also has an aperture 19 extending therethrough, the inner diameter of which is greater than the diameter of the apertures 13, 9 in the bowl bottom 8 and the bowl disc 12.

A scraper ring 20 is attached in a non-rotatable manner to the underside of the bowl disk 12. The scraper ring 20 surrounds the opening 13 of the bowl disk 12 and is flush with it on the inside. Towards the bottom, the scraper ring 20 covers the inner ring 16 of the rolling bearing 14 and a portion of the platform 15. The scraper ring 20 has an outer diameter that is larger than the inner diameter of the opening 19 in the platform 15. The scraper ring 20 thus protects the rolling bearing 14 from contamination. Dirt particles and moisture are prevented from entering the bearing 14.

The profile of the scraper ring 20 is selected in such a way that the scraper ring 20 wipes off with its underside a dough residue located on the upper side of the closure body 11. The wiping takes place during the movement of the closure body 11 from the closure position to the discharge position.

Figure 2:
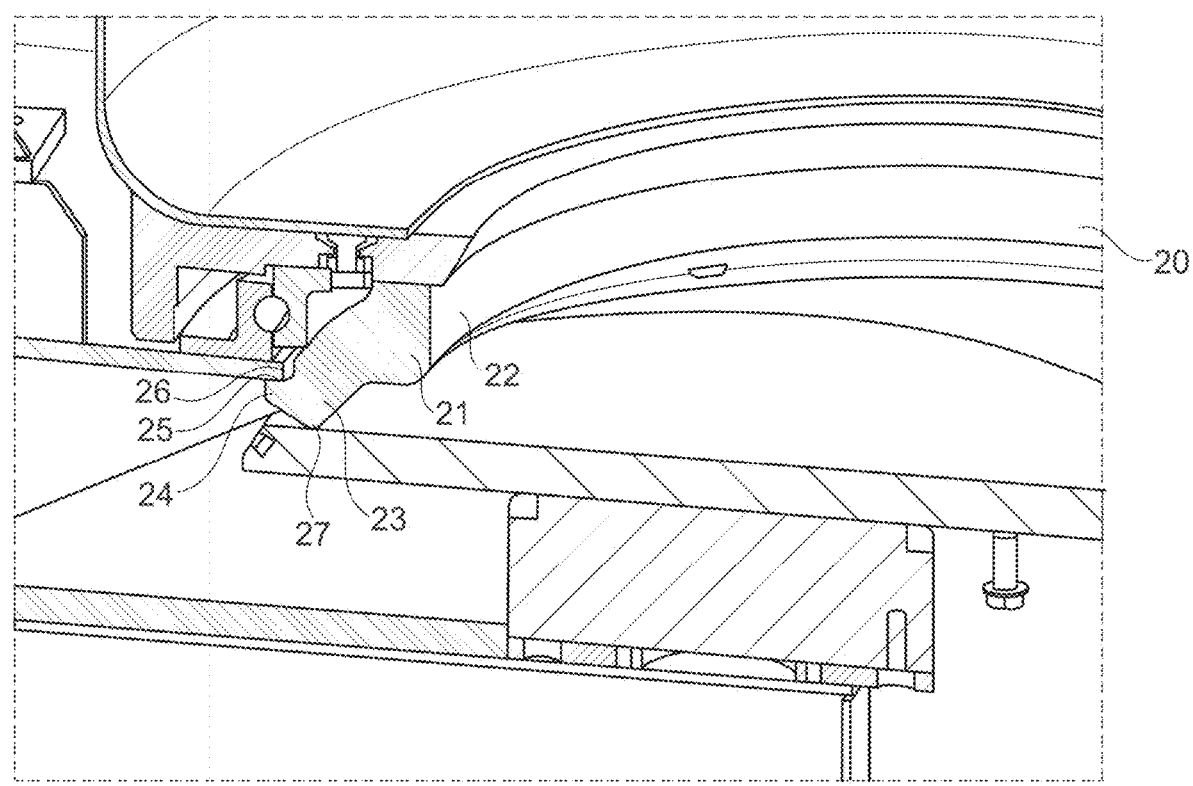
FIG. 2 shows a detailed cutaway view of a scraper ring of the closure device.
Figure 3:
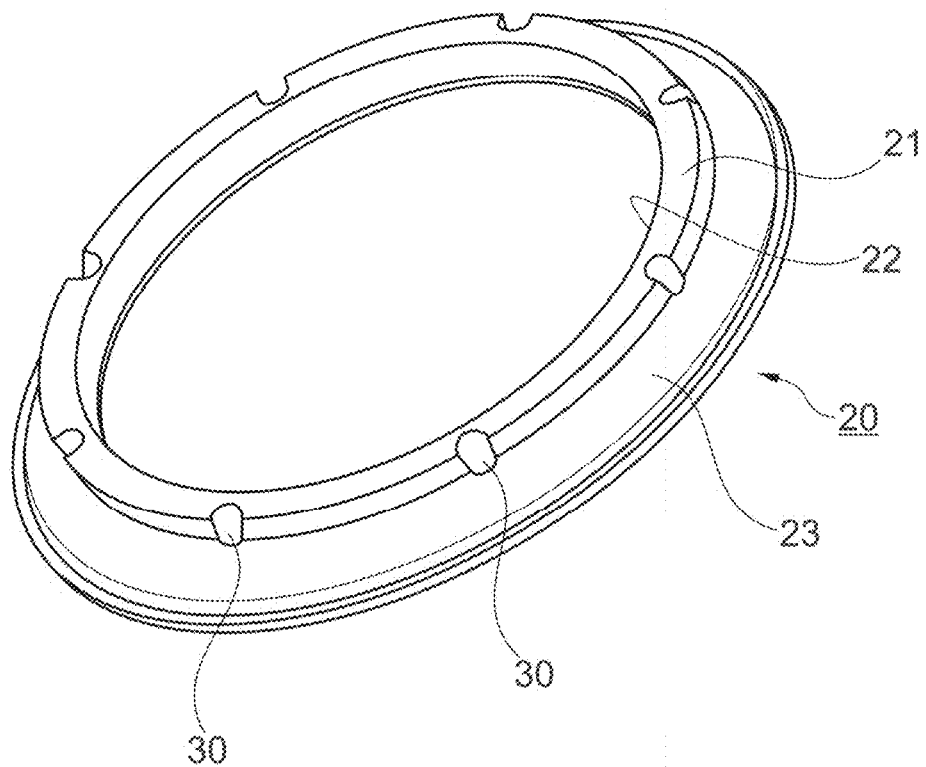
FIG. 3 shows a spatial view of the scraper ring.
Figure 4:
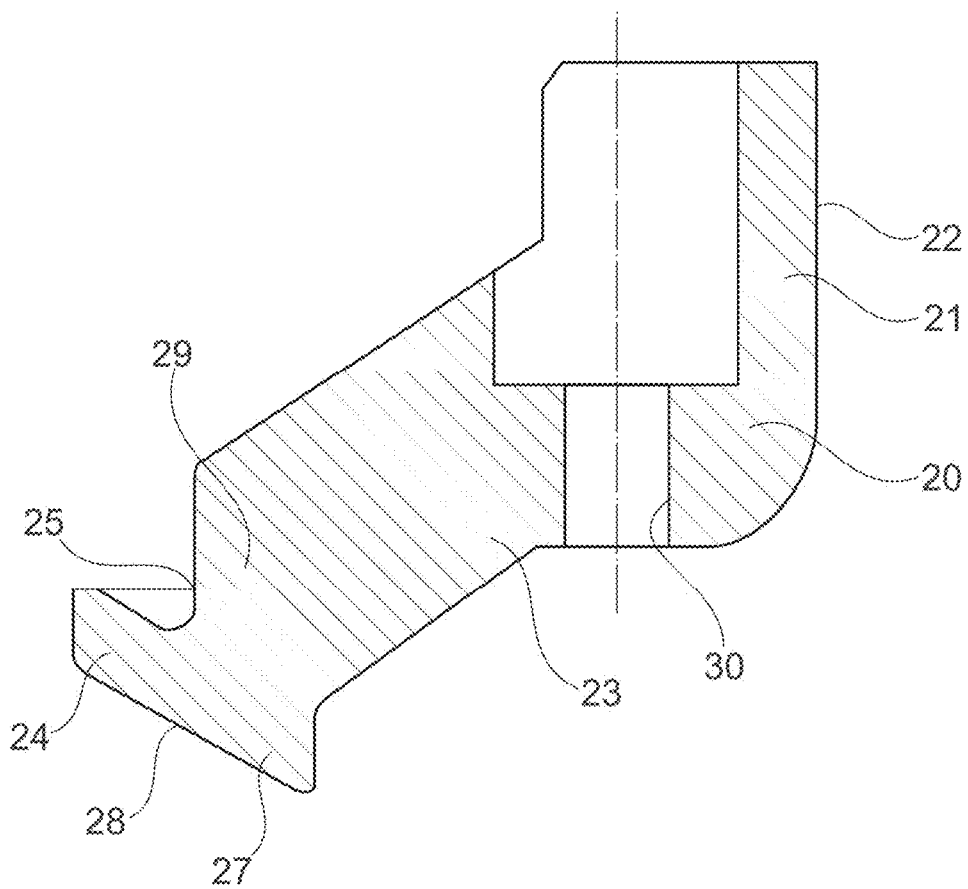
FIG. 4 shows a longitudinal section through one half of the scraper ring.

FIGS. 2 to 4 show the scraper ring 20 in detail. The scraper ring 20 is rotationally symmetrical. It has a circular-cylindrical base body 21 with a central opening 22, adjoined by a conically widening sealing lip 23. In the installed state, the base body 21 is attached to the bowl disk. The opening 22 of the scraper ring 20 is adapted to the opening 13 of the bowl disk, so that a common opening extends from the bottom 8 of the kneading bowl 7 and including a flat inner side without edges or steps. The sealing lip 23 extends radially outwardly and away from the bowl disk toward the platform. At the free end of the sealing lip 23, a first annular nose 24 is provided on the top surface near the bowl disc to provide a receptacle 25 for an edge portion 26 of the platform 15 at the opening 19. The sealing lip 23 is thus in contact with the platform 15 independent of the position and seals the rolling bearing 14 from contamination towards the rear. On the opposite underside remote from the bowl disc, a second annular nose 27 is provided which performs the scraper function. In the region of the two noses 24,27, the sealing lip 23 is approximately V-shaped in longitudinal section, with a first leg 28 positioned at approximately 45° to a longitudinal direction and the other leg 29 extending in the longitudinal direction. The first nose 24 thus defines the outermost end of the sealing lip 23 in the radial direction to the axis of rotation.

FIG. 2 shows an intermediate position of the closure device. The second nose 27 rests on the upper side of the closure body 11. The sealing lip 23 is clamped between the closure body 11 and the platform 15.

Regardless of the angle of rotation of the kneading bowl 7, the scraper ring 20 is always correctly positioned. When moving the closure body 11 into the discharge position, dough residues on the upper side of the closure body 11 are effectively removed by the scraper ring 20.

Preferably, the bowl does not rotate when the closure body is moved to the discharge position. The proximity of the scraper ring to the opening can prevent scraped dough from falling onto the closure device, particularly onto an arm to which the closure body is attached. This is often a problem with linear scrapers—dough residues can fall into the closure device and stick to the positioning mechanism.

FIGS. 3 and 4 show the isolated scraper ring 20. The cylindrical base body 21 has holes 30 at uniform intervals in the circumferential direction to receive the fasteners, in particular screws.

The scraper ring is preferably formed from a wear-resistant, food-grade plastic, in particular polyethylene, e.g., RCH500, RCH100 or metal-detectable ultra-high molecular weight polyethylene (PE-UHMW/PE 1000).

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A kneading machine for food dough, the kneading machine comprising:
    a rotatable kneading bowl including a central opening to discharge the food dough in a bottom; and
    a closure operable to close the opening in an operating position with a movable closure body, and to release the opening to discharge the food dough in a discharge position; wherein
    the opening is at least partially surrounded by a scraper ring fastened to the kneading bowl and operable to cause an underside thereof to contact with an upper side of the closure body to wipe off a portion of the food dough located on the closure body when the closure body is moved from the operating position into the discharge position; and
    the scraper ring is rotationally symmetrical and includes a circular-cylindrical base body with an opening adjacent to a sealing lip, the sealing lip widening conically and radially outward away from the circular-cylindrical base body and defining a radially outermost portion of the scraper ring.

2. The kneading machine according to claim 1, wherein the scraper ring completely surrounds the opening.

3. The kneading machine according to claim 1, wherein the scraper ring is fastened to the kneading bowl using a bowl disk and the kneading bowl is seated on the bowl disk, and the bowl disk is drivable in rotation and includes a bowl opening matching the opening in the bottom of the kneading bowl.

4. The kneading machine according to claim 1, wherein the scraper ring at a free outer end of the sealing lip includes a first annular nose on an upper side of the sealing lip adjacent to the bowl, the first annular nose defining a receptacle of an edge region of a stationary platform at an opening of the stationary platform matching the opening of the bowl.

5. The kneading machine according to claim 1, wherein the scraper ring is fastened to the kneading bowl using a bowl disk and the scraper ring includes, on an underside of the scraper ring remote from the bowl disk and at a free outer end of the sealing lip, a second annular nose to perform the scraper function.

6. The kneading machine according to claim 1, wherein
    the kneading bowl is seated on a stationary platform;
    a rolling bearing surrounding the opening is between the rotatable kneading bowl and the stationary platform to support the kneading bowl relative to the stationary platform; and
    the scraper ring covers the rolling bearing at least partially on the underside to protect against contamination.

7. The kneading machine according to claim 6, wherein the scraper ring is fastened to the kneading bowl using a bowl disk and the rolling bearing includes an inner ring fixed to the underside of the bowl disk and an outer ring fixed to the stationary platform, and the scraper ring covers the inner ring on the underside.

* * * * *